Sept. 4, 1956  J. P. TAMBOLES  2,761,580
DEVICE FOR SUPPORTING BABY FOOD IN THERMOS BOTTLES
Filed Dec. 6, 1955
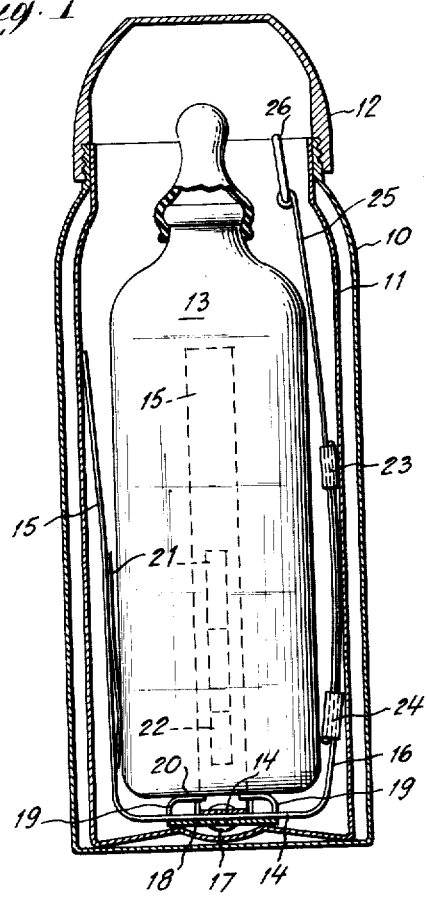
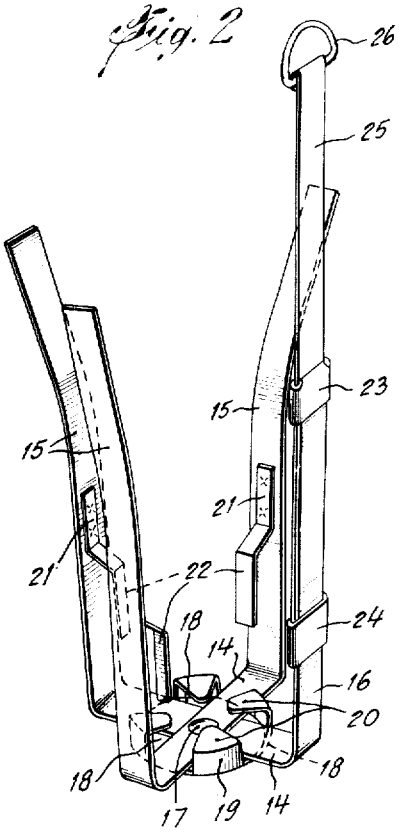
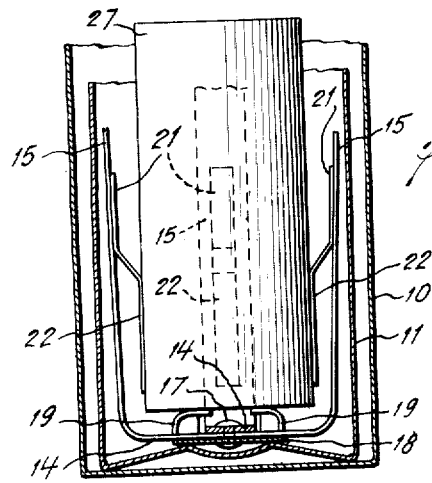
INVENTOR
JAMES P. TAMBOLES
BY Robert J. Hulinger
ATTORNEY

United States Patent Office 2,761,580
Patented Sept. 4, 1956

2,761,580

DEVICE FOR SUPPORTING BABY FOOD IN THERMOS BOTTLES

James P. Tamboles, Stamford, Conn.

Application December 6, 1955, Serial No. 551,282

3 Claims. (Cl. 215—100)

This invention relates to new and useful improvements in shock absorbing holders to be disposed within a vacuum container to support a baby's milk bottle or other container therein.

An object of the invention is to provide a simple, durable, efficient and economical shock absorbing holder which can be inserted within a vacuum container to support a milk bottle therein.

A further object is to provide a simple holder which can also support containers smaller than babies' milk bottles, such as cans of baby food.

A further object is to provide a construction of holder which permits it to be readily lifted out of the container without the hands of the operator coming into contact with the hot liquid within the vacuum container.

The present preferred form of the invention is illustrated in the drawings of which, Fig. 1 is a vertical central longitudinal section through the device with a milk bottle supported therein;

Fig. 2 is a perspective view of the shock absorbing holder; and,

Fig. 3 is a partial vertical longitudinal section through the vacuum container showing a can of baby's food disposed therein.

Referring to the particular form of the invention illustrated it will be seen that there is employed a vacuum bottle with a wide mouth and having spaced walls 10 and 11 between which a vacuum is provided in any usual manner. The bottle is provided with a tight sealing cap 12.

Removably inserted within the vacuum bottle is a holder formed of a pair of crossed U-shaped strips of material which are crossed at their base portions 14 and held together by a rivet 17 or other suitable fastener. The legs of these strips are upwardly extending outwardly flared lengths of spring metal 15 which extend upwardly along the inner surface of the vacuum bottle. Below the point of connection between the bases 14 of the strips is a plate 18 of metal or plastic having spaced upturned ears 19 which at the top are bent inwardly and horizontally to form platforms 20 on which the baby's milk bottle 13 may rest as shown in Fig. 1.

Attached to the inner faces of the strips 15 just above the bases thereof are auxiliary springs welded at 21 to the strips and having dependent portions 22 of spring metal spaced inwardly from the strips to provide a spring cushion to receive a container of smaller diameter than the milk bottle 13, such as a small can of baby's food 27 shown in Fig. 3.

One of the strip portions marked 16 has a loop 23 formed at its top to receive another strip 25 having a loop 24 at its bottom. The strip 25 has a handle or ring 26 at its top. The loop 24 embraces the strip portion 16 and the loop 23 embraces the strip portion 25 whereby the strip 25 may be raised and lowered through the intermediary of the ring 26. As shown in Fig. 1 the milk bottle 13 is disposed within the vacuum container and is snugly housed within the holder therein against shock or any jars which would break either the vacuum container or the milk bottle. The strip 25 has been pushed down as far as it will go but the ring 26 is disposed near the top of the vacuum bottle under the cap 12 where it is readily available to the hand of the person using the device. The finger of the person may be engaged with the ring 26 without coming in contact with the hot liquid within the vacuum bottle and lifted, whereupon the holder with the milk bottle or can of food may be raised out of the container ready for use.

To parents with small children, when out of the home on trips or picnics, it is exceedingly desirable to have the baby's milk bottle kept warm as long as possible, and it is also desirable that baby's food in small cans be warmed up before being fed to the child. With the device herein shown, the milk bottle can be disposed in the vacuum container before leaving the house and fed to the baby when desired. After feeding the milk a small can of baby food may then be inserted and by the time it is needed to feed it to the child, it will have warmed up properly. Thus the problem of baby feeding away from home is nicely solved by the use of this simple, efficient and economical device.

What I claim as my invention, is:

1. A shock-absorbing holder to support baby food containers which comprises a plurality of U-shaped elongate spring strips disposed in spaced relation and connected at their bases, a plate disposed below said bases and connected thereto, overturned flanges on the edges of said plate and extending up and over between the strips to form a support for the bottom of the baby food container.

2. A shock-absorbing holder to support a baby food container which comprises a plurality of U-shaped elongate flared spring strips disposed in spaced relation and connected at their bases, and auxiliary spring members disposed on the inner faces of said strips just above their bases and extending inwardly from said strips to resiliently house a smaller container when desired, a plate disposed below said bases and connected thereto, overturned flanges on the edges of said plate and extending up and over between the strips to form a support for the bottom of the baby food container.

3. A shock-absorbing holder to support a baby food container which comprises a plurality of U-shaped elongate flared spring strips disposed in spaced relation and connected at their bases, and auxiliary spring members disposed on the inner faces of said strips just above their bases and extending inwardly from said strips to resiliently house a smaller container when desired, a plate disposed below said bases and connected thereto, overturned flanges on the edges of said plate and extending up and over between the strips to form a support for the bottom of the baby food container, one of said strips having a loop at its top, a handle strip having a loop at its bottom and embracing the first mentioned strip, the loop at the top of the first named strip embracing the handle strip to provide a sliding connection whereby the handle strip may be raised and lowered with respect to its associated strip.

References Cited in the file of this patent

UNITED STATES PATENTS

| | | |
|---|---|---|
| 579,353 | Trebilcock et al. | Mar. 23, 1897 |
| 1,116,993 | Carlson | Nov. 10, 1914 |
| 2,215,411 | Sebring | Sept. 17, 1940 |
| 2,292,430 | Charlston | Aug. 11, 1942 |

UNITED STATES PATENT OFFICE
CERTIFICATION OF CORRECTION

Patent No. 2,761,580                                      September 4, 1956

James P. Tamboles

It is hereby certified that error appears in the above numbered patent requiring correction and that the said Letters Patent should read as corrected below.

In the heading to the drawings, line 2, and in the heading to the printed specification, line 3, in the title, for "THERMOS", each occurrence, read -- VACUUM --.

Signed and sealed this 27th day of June 1961.

(SEAL)
Attest:

ERNEST W. SWIDER                                    DAVID L. LADD
Attesting Officer                                       Commissioner of Patents